United States Patent Office 3,268,585
Patented August 23, 1966

3,268,585
AURAMINE PROCESS USING SULFAMIC ACID
Rill Lewis Grosklos, Marietta, Ohio, assignor to American Cyanamid Company, Stamford, Conn., a corporation of Maine
No Drawing. Filed July 3, 1963, Ser. No. 292,765
7 Claims. (Cl. 260—566)

This invention relates to a new process for the preparation of auramine and auramine sulfamate and, more particularly, to a process wherein N,N,N',N'-tetramethyldiaminodiphenylmethane is heated in the presence of sulfur, urea, sulfamic acid (or the ammonium salt thereof) to give high yields of auramine sulfamate, a new compound which can be easily converted to auramine base; and to the sulfamic acid salt of auramine.

Auramine is a dye of considerable commercial importance, and substantial quantities of it are manufactured annually.

Several methods have been used for the manufacture of auramine. The most conventional procedure for preparing auramine may be represented by the following equation:

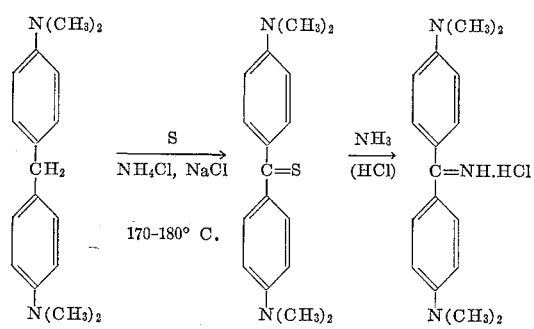

This method results in about a 60% yield and is otherwise often unsatisfactory because of the difficulties encountered in the control of reaction conditions.

The present invention is based on the discovery that by reacting p,p'-N,N,N',N'-tetramethyldiaminodiphenylmethane with sulfur in the presence of urea and sulfamic acid (or its ammonia salt), improved yields result with further improvement in the working and control of the reaction. In addition, more vigorous reaction conditions may be used for improved yields; also, the auramine product as produced, in the form of its sulfamic acid salt, either isolated or in admixture with the components of the reaction mixture, is of such quality that it may be used directly for dyeing and coloring purposes. Thus, the reaction mixture itself containing the auramine sulfamate, is a useful product without further purification or treatment. It is also convenient to maintain an ammonia atmosphere in carrying out the improved process of this invention; however, it is an advantage of this invention that the use of ammonia is not necessary. Although the reason why ammonia is unnecessary is uncertain, it may be that sufficient ammonia results from decomposing urea that additional ammonia is not essential for completion of the reaction.

In carrying out the improved process of this invention, the methane base is heated with sulfamic acid (or the ammonium salt thereof) in the presence of urea and sulfur. Ammonia may be used to blanket the reaction mixture. The process may be represented as follows:

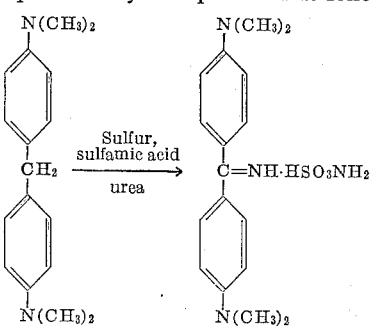

The ammonium salt of sulfamic acid may be used instead of the acid per se in the above reaction.

In the process of this invention, from about 25 to 50 parts of sulfur are used for each 100 parts of the methane base. A preferred amount is about 33 parts.

Although it is preferred to use sulfamic acid itself, its ammonium salt may also be used. From about 30 to 60 parts of the sulfamic acid are used per 100 parts of methane base. A preferred amount is 38 to 39 parts.

Urea itself is conveniently used in the process although mono- and di-lower alkyl substituted ureas may instead be used. From about 100 to 200 parts of the urea are used in the process with a preferred amount being about 160 to 165 parts per 100 parts of the methane base.

The temperature to which the reaction mixture is heated ranges from about 120° to 200° C. A convenient range is from about 150° to 200° C., with a preferred temperature range being about 165° to 185° C.

The process of this invention results in high yields of auramine. Whereas temperatures above about 165° C. would cause deleterious side effects with lower yields in previously known processes, using sulfamic acid and urea in the improved process of this invention, such higher temperatures are applied without adverse effect and, in fact, with an advantageous increase in yield. Thus, a temperature of about 175° (in place of the previously employed temperature of 165° C.) causes substantial increases in yields, but it is noted that increasing the temperature above about 185° C. results in no further improvement.

The high yields obtained using sulfamic acid (or its ammonium salt) are quite unexpected in that other common types of salts are not effective for improving yields. Thus, salts such as ammonium chloride or ammonium acetate are not suitable. Ammonium chloride and auramine hydrochloride are solid at reaction temperatures and, thus, cause a reaction slow-down accompanied by stirring difficulties. Ammonium acetate sublimes out the mixture, plugs lines and causes other complications. When ammonium acetate is used for the preparation of auramine, a yield of only 64.3% is obtained; with ammonium chloride under similar conditions, a yield of only 26.5% results.

Auramine, as the hydrochloride, may be isolated from the reaction product of this invention by salting out with sodium chloride. This step effects conversion of the auramine (present in the reaction product as the sulfamate), to said hydrochloride.

It is a further feature of this invention that, due to the high quality of the auramine sulfamate salt obtained in the reaction product, the reaction mixture itself, with little, if any, further purification, may be used without conversion to the hydrochloride. Heretofore, it was always necessary to isolate the auramine hydrochloride to make it applicable for commercial purposes. The formation of the auramine proceeds according to the invention in such a clean and straightforward manner without excessive formation of tars and other undesirable by-products, that isolation of the auramine is generally unnecessary. Instead, the reaction mixture itself, containing the auramine sulfamate, may be used directly for commercial coloring purposes. Thus, for many purposes, the reaction product itself, may be cooled to cause it to solidify, and then simply ground to a fine powder. The latter is suitable as a commercially valuable auramine dye composition. This feature makes the process especially desirable from the commercial standpoint.

The invention is further illustrated by the examples which follow.

*Example 1*

A mixture of 84 parts of urea and 102 parts of p,p'-tetramethyldiaminodiphenylmethane is heated to 120° C. in an atmosphere of ammonia. Then, 34 parts of sulfur and an additional 82 parts of urea are added, and the mixture is reheated to 120° C. After adding 40 parts of sulfamic acid, the mixture is heated to 175° C. over a period of about 3¼ hours, maintaining an atmosphere of ammonia over the mixture, but allowing product gases to escape. The mixture is then stirred for an additional two hours at 174–176° C.

The reaction mixture is then added to 5700 parts of water. The turbid solution which forms is clarified with a filtration aid and the product is isolated by salting out with sodium chloride. The solid material, obtained by filtration and drying, contains 117.7 parts of auramine hydrochloride monohydrate. Yield: 91%.

*Example 2*

Following the procedure of Example 1 except for the use of 25% more urea, gives substantially the same yield of the auramine product.

*Example 3*

Following the procedure of Example 1 except for the use of 50% more sulfamic acid, gives substantially the same result as obtained in Example 1.

*Example 4*

When the procedure of Example 1 was followed except for the omission of sulfamic acid, the yield of the auramine product was only 65%.

*Example 5*

When the procedure of Example 1 was followed except that the mixture was heated to only 165° C., the yield of auramine was 85%.

*Example 6*

Following the procedure of Example 1 except for the use of 46 parts of ammonium sulfamate in place of the sulfamic acid used therein, gives a high quality auramine product in a yield of 87.1%.

When the procedure of this example is repeated except for omission of urea, the yield of auramine falls to only 4.8%.

*Example 7*

When the procedure of Example 6 is followed except for the substitution of ammonium acetate for the ammonium sulfamate used therein, the yield of auramine is only 64.3%.

*Example 8*

The procedure of Example 1 is repeated to the point of heating the reaction mixture until reaction is complete. However, instead of adding to water, the reaction mixture is simply allowed to cool. The solidified material which forms, is broken into pieces and comminuted. An assay on this material to determine auramine content shows a yield of approximately 91%. The product as such may be used in normal auramine applications.

I claim:
1. A process for the preparation of an auramine salt which comprises heating to a temperature between 120° and 200° C., a mixture of : (a) p,p'-(dimethyldiamino)diphenylmethane; (b) 0.25–0.5 part by weight of sulfur, based on the weight of (a); (c) at least 0.3 part by weight of a member selected from the group consisting of sulfamic acid and ammonium sulfamate per part of (a); and (d) at least about one part by weight of urea per part of (a); and recovering the auramine product thus formed.

2. The process of claim 1 wherein between 0.3 and 0.6 part by weight of sulfamic acid is employed.

3. The process of claim 1 wherein about 0.33 part by weight of sulfur is employed.

4. The process of claim 1 wherein an atmosphere of ammonia is maintained over the reaction mixture while it is being heated.

5. The process of claim 1 wherein the reaction temperature is maintained between 160° and 175° C.

6. The process of claim 1 wherein auramine hydrochloride is isolated by addition of sodium chloride to the reaction product.

7. The process of claim 1 wherein the reaction product is cooled to room temperature and comminuted.

References Cited by the Examiner

UNITED STATES PATENTS 3,112,326  11/1963  Rudner et al. ____ 260—566 XR

OTHER REFERENCES

Gould: "Inorganic Reactions," p. 291 (1955).
Lubs: "The Chemistry of Synthetic Dyes and Pigments," p. 246 (1955).
Lynch et al.: J.A.C.S., vol. 55, pp. 2515–2520 (1933).
Noller: "Chemistry of Organic Compounds," p. 299 (1955).
Semper: C.A., vol. 5, p. 3414 (1911).
Weyker et al.: C.A., vol. 58, p. 11274e (1963).

CHARLES B. PARKER, *Primary Examiner.*

FLOYD D. HIGEL, *Assistant Examiner.*